United States Patent [19]

Tomishima et al.

[11] Patent Number: 4,752,640
[45] Date of Patent: Jun. 21, 1988

[54] TEMPERATURE CONTROLLING METHOD FOR POLYMERIZATION REACTORS

[75] Inventors: Yoshio Tomishima, Kobe; Teiji Kobayashi; Kyosuke Kuratsune, both of Takasago, all of Japan

[73] Assignee: Kanegafuchi Chemical Industry Co., Ltd., Osaka, Japan

[21] Appl. No.: 758,140

[22] Filed: Jul. 23, 1985

[30] Foreign Application Priority Data

Jul. 27, 1984 [JP] Japan ............................. 59-158433

[51] Int. Cl.$^4$ .............................................. C08F 2/10
[52] U.S. Cl. .......................................... 526/61; 526/68; 526/67; 526/344.2; 422/138
[58] Field of Search ................. 526/61, 68, 70, 344.2, 526/67; 422/138

[56] References Cited

U.S. PATENT DOCUMENTS 4,024,329  5/1977  Lauer et al. ................. 526/68 X
4,061,848  12/1977  Sistig et al. ......................... 526/61

FOREIGN PATENT DOCUMENTS 2069369  8/1981  United Kingdom ................. 526/61

Primary Examiner—Joseph L. Schofer
Assistant Examiner—F. M. Teskin
Attorney, Agent, or Firm—Wegner & Bretschneider

[57] ABSTRACT

A reflux condenser attracts attention from the standpoints of improvement in productivity by increase in cooling capacity as well as saving in energy, and recently, it is frequently employed in particularly large-sized polymerization reactors. But, the well-known cooling method has a problem that the overall heat transfer coefficient of condensers lowers with the progress of polymerization to result in the reduction of heat-removing capacity and reduction of the stability of polymerization temperature control. In order to solve the above problems, in the present invention the temperature is controlled with the heat amount removed by the condenser as a control variable, coupled with intermittent purge of a part of the unreacted monomer from the reflux condenser.

8 Claims, 3 Drawing Sheets

TEMPERATURE CONTROLLING METHOD FOR POLYMERIZATION REACTORS

BACKGROUND OF THE INVENTION

A reflux condenser attracts attention from the standpoints of improvement in productivity by increase in cooling capacity as well as saving in energy, and recently, it is frequently employed in particularly large-sized polymerization reactors. But, the well-known cooling method has a problem that the overall heat-transfer coefficient of reflux condensers lowers with the progress of polymerization to result in the reduction of heat-removing capacity and reduction of the stability of polymerization temperature control.

In order to solve these problems, there have so far been proposed the following methods: A method to raise the heat-transfer capacity by forced vapor circulation into a reflux condenser (described in Japanese patent publication No. 29196/1976); a method to control the capacity by the weighted average of the readings of one or several temperature detecters set up in the reflux condenser (described in U.S. Pat. No. 4,061,848), and the like. But, the former method requires expensive circulating blowers, and the latter one requires large-sized condensers because of a small heat-transfer coefficient. Thus, both methods were not always said to be satisfactory.

In cooling methods with a reflux condenser, it is thought that the overall heat-transfer coefficient of the condenser is generally not less than 500 kcal/m$^2$·hr·°C. In practical polymerization, however, the coefficient was as low as 100 to 150 kcal/m$^2$·hr·°C., so that very uneconomical large-scale equipments were required.

The reduction of heat-transfer coefficient may be considered to be due to non-condensable gases in the reactor, for example air present from before the polymerization, and CO, $CO_2$ and $N_2$ generated by decomposition of a polymerization initiator, which are carried to the surface of heat-transfer tubes of the condenser together with condensable vapors or gases such as the monomer, etc., and concentrated thereat.

SUMMARY OF THE INVENTION

An object of the present invention is to reduce the size of the condenser and also stably control the polymerization temperature. In order to achieve the above object, the temperature is controlled with a heat amount removed by the condenser as a control variable, coupled with intermittent purge of a part of the unreacted monomer vapor from the reflux condenser in liquid-phase polymerization using a reflux condenser.

According to the present invention, the heat-transfer coefficient of condensers can be raised to two times or more as compared with the conventional methods, so that the size of the condenser can be reduced to a half or less; and the control becomes more stable, so that a rise in the productivity of polymerization and a reduction in cost can be attained.

DETAILED DESCRIPTION OF THE INVENTION

The present invention relates to a temperature controlling method for liquid-phase polymerization reactors equipped with a reflux condenser (hereinafter referred simply to as the condenser).

In order to solve a problem of reduction in the heat-transfer coefficient, the condensable vapors or gases from the reactor are intermittently purged (released) at the portion of the condenser opposite to the reactor in such a manner that the shortpass of the fresh condensable vapors or gases is not raised. By this means, since the condensable vapors or gases containing the non-condensable gases in high concentrations present at the surface of heat-transfer tubes are replaced by the fresh condensable vapors or gases, improvement in the heat-transfer coefficient of the condenser and reduction in the size thereof can be achieved.

In general, however, when the monomer vapor is purged from the condenser, the temperature in reactor, because of a sudden change in the heat-transfer coefficient, suddenly lowers to cause a large change in the jacket temperature and temperature in reactor, and as a result, there is a danger that the control can become unstable and cause a run away reaction. A sudden increase in heat amount removed causes the reaction liquid to foam and overflow into the condenser. This overflow causes undesirable operational problems such as deposition of scales to the inside surface of the condenser, plugging of polymer scales in the conduit between the reactor and the condenser, and deterioration of the products qualities such as fish eyes.

For example, when vinyl chloride is polymerized using a condenser of which the overall heat-transfer coefficient is 150 kcal/m$^2$·hr·°C. after an operation for about 3 hours, about 10 minutes' purge of the monomer vapor raises the heat-transfer coefficient to 700 kcal/m$^2$·hr·°C., but this sudden change in the coefficient suddenly lowers the temperature in the reactor, which cause a danger as described above.

Consequently, in a system wherein the heat-transfer coefficient suddenly changes, it is impossible to carry out the control exactly by the conventional controlling method using the condenser cooling water temperature as a control variable.

A controlling method useful in this case is to measure the flow rate of cooling water (F) as well as the inlet temperature ($T_2$) and outlet temperature ($T_3$) of the cooling water, calculate the heat amount removed by the condenser according to the equation;

$$Q_{RC}=C_p \cdot \rho \cdot F(T_3-T_2)$$

(wherein $C_p$ is specific heat and $\rho$ is density) and use the obtained value as a control variable.

The present invention provides the following method: In polymerization using a reflux condenser, a method for controlling the temperature in reactor characterized in that said temperature is controlled with the heat amount removed by the condenser as a control variable, coupled with intermittent purge of a part of the unreacted monomer from the reflux condenser.

Figure 1:
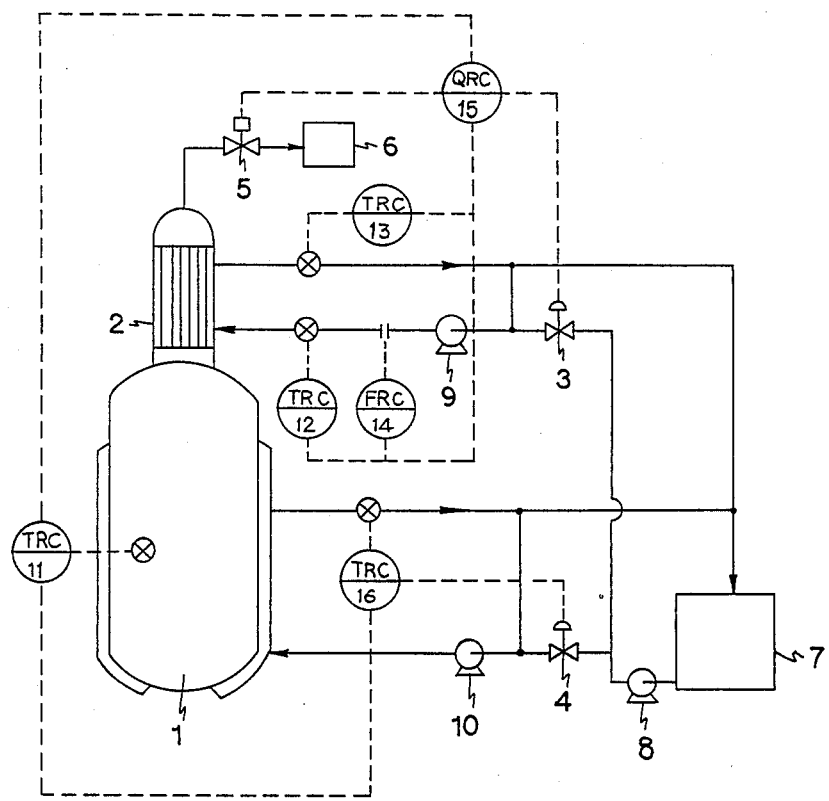
FIG. 1 shows one example of control system diagrams for a reflux condenser mounted on a polymerization reactor.

FIG. 1 is one example of the present invention illustrating the control of a condenser set up in a polymerization reactor. In the figure, (1) is a polymerization reactor, (2) is a reflux condenser, (3) and (4) are a cooling water controlling valves, (5) is an unreacted gas discharging valve, (6) is an unreacted gas recovering apparatus, (7) is a cooling water tower, (8) is a cooling water supplying pump, and (9) and (10) are cooling water circulating pumps.

In the present invention, for intermittent purge of a part of the unreacted monomer vapor from a condenser (2), there is a simple method in which the purge is carried out for a short time at a definite time interval by program control, and a method in which the condenser-removed heat amount controller QRC 15 is read at a definite time interval, and only when the reading does not reach the setting, purge is carried out for a short time.

In the present invention, the temperature in reactor may be controlled by setting the set value of the reactor jacket temperature controller TRC 16 at the output of the reactor temperature controller TRC 11, in other word the temperature may be controlled by the cascade control between the TRC 11 and TRC 16. Moreover it may be controlled by setting the set value of the condenser-removed heat amount controller QRC 15 at the output of TRC 11, or setting both set values of TRC 16 and QRC 15. at the output of TRC 11. For controlling the temperature and flow rate of condenser cooling water, it suffices to set the set value of the condenser cooling water outlet temperature controller TRC 13 or condenser cooling water inlet temperature controller TRC 12 or condenser cooling water flow rate controller FRC 14 at the output of QRC 15.

For example, by employing the cascade-type controlling method in which the set value of QRC 15 is set at the output of TRC 11 and in turn the cooling water controlling valve (3) is adjusted with the output of QRC 15, very rapid and highly stable control can be attained.

Alternatively, controllability is largely improved by employing the cascade-type controlling method in which the set value of TRC 12, TRC 13 or FRC 14 is set at the output of QRC 15 and in, turn said valve (3) is adjusted with the output of TRC 12, TRC 13 or FRC 14.

In purging the unreacted monomer, continuous purge increases the amount of the gas purged to result in a reduction in the conversion of reaction and productivity as well as a rise in cost required for compression purification of the recovered monomer. It is therefore desirable not to purge larger amounts than required. In order to avoid excessive purge, the purge is carried out intermittently, for example, for a definite time, preferably 0.5 second to 20 minutes at a definite time interval, preferably every 30 seconds to 2 hours. By this method, as high a heat-transfer coefficient as not less than 500 kcal/m$^2$·hr·°C. can be ensured.

As to the number of purges and the rate of purged vapor, it is preferred to minimize the amount of vapor purged so far as there is no hindrance to obtaining heat-transfer coefficients necessary for heat removal. By constantly checking the setting and reading of QRC 15 by means of a computer and carrying out purge only when the reading does not reach the setting, it becomes possible to attain a large reduction in the amount of vapor purged as a whole and stable control. It is preferred to check the heat amount removed by the condenser every 1 to 30 minutes. Frequent checks at intervals of less than 1 minute are not necessary, and such check is also disadvantageous in terms of the operation time of a computer. But, at long intervals of more than 30 minutes, a great deal of purge is necessary, the control tending to become unstable. The purge time is preferably 0.5 second to 5 minutes. Purge times less than 0.5 seconds cause the shortage of purge because of the valve response time, and ones more than 5 minutes have a fear of the control becoming unstable. The rate of purged gas is preferably within a range of 10 to 500 kg/hr per unit volume (m$^3$) of polymerization reactor. Rates less than 10 kg/m$^3$·hr have little effect, and ones more than 500 kg/m$^3$·hr have a fear of the purge line being blocked with the reaction product because of foaming. Consequently, rates within a range of 100 to 200 kg/m$^3$·hr are particularly preferred.

The method for the control of polymerization reactors according to the present invention may be applied to any liquid-phase reaction system. Such system includes for example emulsion polymerization of butadiene, suspension or emulsion homo- or co-polymerization of vinyl chloride, emulsion polymerization of vinylidene chloride, block, suspension or emulsion polymerization of styrene or acrylic monomer, and the like.

If the present invention is applied to a system of the reduced pressure lower than the atmospheric pressure, it is necessary that a pressure reducing device is installed in the unreacted gas recovering apparatus (6).

The term, "condensable vapor or gas", referred to herein means vapor or gas which can be condensed at a reflux condenser set up to remove the heat of polymerization generated by liquid-phase polymerization. For example, there are given the vapor of a monomer itself; when the polymerization is solution polymerization, the vapor of the solvent; and the vapor of a boiling agent added to the system independently of the reaction.

The present invention will be illustrated hereinafter with reference to the following examples.

EXAMPLE 1

A 80° C. hot water was passed through a 70 m$^2$ condenser set up to a 30 m$^3$ polymerization reactor, and then 13,000 kg of deionized water, 7.8 kg of di-2-ethylhexyl peroxydicarbonate and 230 liters of a 3% aqueous solution of partially saponified polyvinyl alcohol were added. After deaerating the polymerization reactor for 15 minutes with stirring, 13,000 kg of a vinyl chloride monomer was added, and the mixture was heated to 58° C. to start polymerization. The temperature in the reactor was controlled by setting the set value of the reactor jacket temperature controller at the output of the reactor temperature controller. At the point when the polymerization conversion reached 5%, passage of cooling water through the condenser was started. After setting the set value of the condenser cooling water outlet temperature controller at the output of the condenser-removed heat amount controller, program control was carried out so that the heat amount removed by the condenser gradually increased to 500,000 kcal/hr.

After passing cooling water through the condenser, the monomer was purged at a rate of 3600 kg/hr for 5 seconds every ten minutes at the top of the condenser. At that time, the temperature in reactor was stabilized, the controllability was good and the heat-transfer coefficient of the condenser was 500 to 700 kcal/m$^2$·hr·°C. The total amount of the gas purged until completion of polymerization was about 180 kg.

EXAMPLE 2

Polymerization was started in the same manner as in Example 1. At the point when the conversion reached 5%, the reactor jacket cooling water controller was constant-value controlled at 35° C., and then according to the cascade-type controlling method in which the set value of the condenser-removed heat amount controller was set at the output of the reactor temperature controller and the set value of the condenser cooling water flow rate controller was set at the output of the condenser-removed heat amount controller, the cooling water controlling valve was adjusted with the output of the condenser cooling water flow rate controller. After passing cooling water through the condenser, the setting and reading of the condenser-removed heat amount controller were checked every 2 minutes, and when the reading did not reach the setting, the monomer gas was purged at a rate of 5400 kg/hr for 2 minutes. At that time, the temperature in reactor was much stabilized, the controllability was good and the heat-transfer coefficient of the condenser was 400 to 600 kcal/m$^2$·hr·°C. The total amount of the gas purged until completion of polymerization was about 60 kg.

EXAMPLE 3

Figure 2:
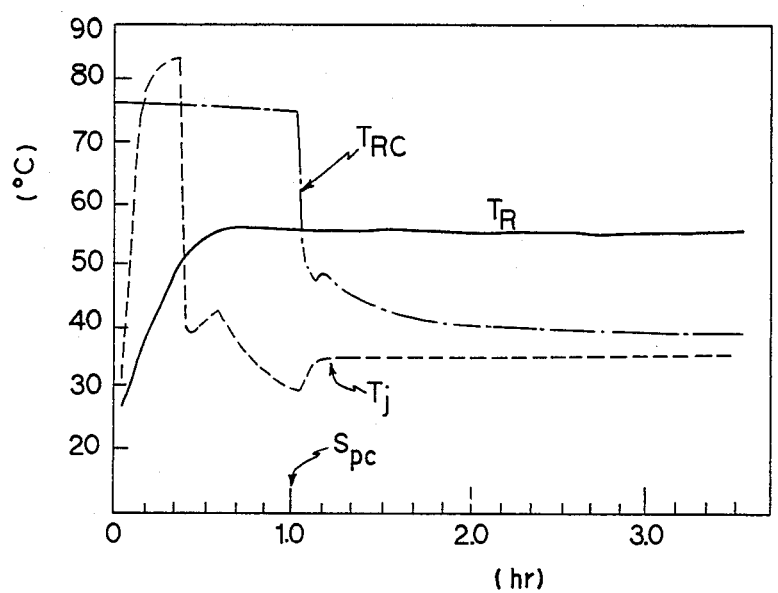
FIG. 2 shows a graph illustrating the change of temperature in reactor ($T_R$) when the method of Example 3 was carried out.

Polymerization was started in the same manner as in Example 1. At the point when the conversion reached 5%, the reactor jacket cooling water controller was constant-value controlled at 35° C., and then according to the cascade-type controlling method in which the set value of the condenser-removed heat amount controller was set at the output of the reactor temperature controller and the set value of the condenser cooling water inlet temperature controller was set at the output of the condenser-removed heat amount controller, the cooling water controlling valve was adjusted with the output of the condenser cooling water inlet temperature controller. After passing cooling water through the condenser, the setting and reading of the condenser-removed heat amount controller were checked every 5 minutes, and when the reading did not reach the setting, the monomer gas was purged at a rate of 4800 kg/hr for 3 minutes. As a result, the temperature in reactor ($T_R$) was much stabilized as shown in FIG. 2, the heat-transfer cofficient was 400 to 500 kcal/m$^2$·hr·°C. and the total amount of the gas purged was about 100 kg. In FIG. 2, condenser cooling water temperature, jacket cooling water temperature and start of passage of cooling water through condenser are represented by $T_{RC}$, $T_j$ and $S_{pc}$.

EXAMPLE 4

Polymerization was carried out in the same manner as in Example 3, during which the setting and reading of condenser-removed heat amount were compared with each other every 20 minutes, and when the reading did not reach the setting, the monomer was purged for 4 minutes at a rate of 450 kg/hr. As a result, the temperature in reactor was stabilized, and the heat-transfer coefficient of the condenser was 300 to 400 kcal/m$^2$·hr·°C. The total amount of the gas purged until completion of polymerization was about 300 kg.

COMPARATIVE EXAMPLE 1

Polymerization was started in the same manner as in Example 1 except that the amount of di-2-ethylhexyl peroxydicarbonate was 3.9 kg. At the point when the conversion reached 5%, cooling water was gradually passed through the condenser, and the condenser cooling water outlet temperature was constant-value controlled at 35° C. After cooling water was passed through the condenser, continuous purge was carried out at a rate of about 50 kg/hr. As a result, the heat-transfer coefficient was as low as 200 to 250 kcal/m$^2$·hr·°C., and the total amount of the gas purged was about 300 kg.

COMPARATIVE EXAMPLE 2

Polymerization was started in the same manner as in Example 1. At the point when the conversion reached 5%, cooling water was gradually passed through the condenser, and the condenser cooling water outlet temperature was controlled at 35° C. After cooling water was passed through the condenser, continuous purge was carried out at a rate of about 500 kg/hr. As a result, the heat-transfer coefficient was 300 to 400 kcal/m$^2$·hr·°C., and the amount of the gas required to purge was as large as about 3000 kg.

COMPARTIVE EXAMPLE 3

Figure 3:
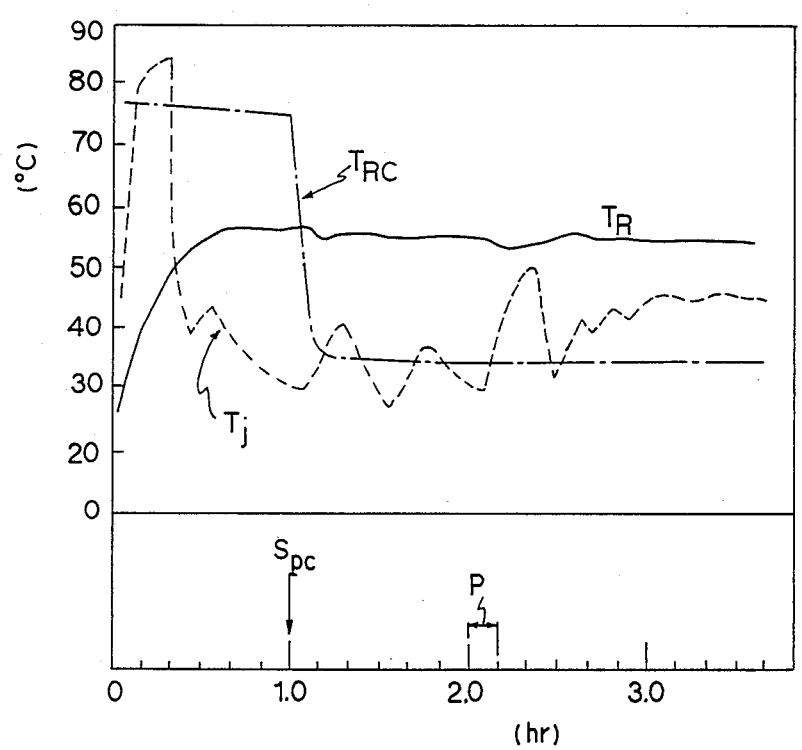
FIG. 3 shows a graph illustrating the change of temperature in reactor when the method of Comparative example 3 was carried out.

Polymerization was started in the same manner as in Example 1. At the point when the conversion reached 5%, the condenser cooling water temperature ($T_{RC}$) was constant-value controlled at 35° C. One hour after starting the passage of cooling water ($S_{pc}$) through the condenser, purge (P) was carried out for 10 minutes at a rate of 3600 kg/hr. The heat-transfer coefficient before purge was 150 kcal/m$^2$·hr·°C., but that just after purge reached 700 kcal/m$^2$·hr·°C. and then gradually lowered to 300 kcal/m$^2$·hr·°C. The temperature in reactor ($T_R$) suddenly lowered with the purge, and the jacket temperature ($T_j$) became unstable because of great hunting. The state of change in temperature was shown in FIG. 3. The total amount of the gas purged was about 600 kg.

What is claimed is:

1. A process for liquid-phase polymerization of a monomer in a reaction system comprising a reaction vessel and a reflux condenser in communication with the reaction vessel, said process comprising:
   polymerizing a liquid reaction mixture comprising monomer to be polymerized in the reaction vessel;
   collecting vaporized, unreacted monomer from the reaction vessel in the reflux condenser;
   returning condensed monomer from the reflux condenser to the reaction vessel;
   wherein the temperature of the reaction mixture is controlled with a heat amount removed by the reflex condenser as a control variable, coupled with intermittent purge of a part of the unreacted monomer from the reflux condenser.

2. A process as claimed in claim 1, said reaction system further comprising a condenser-removed heat amount controller and a reactor temperature controller, wherein said temperature is controlled by setting the set value of the condenser-removed heat controller at the output of the reactor temperature controller.

3. A process as claimed in claim 1, said reaction system further comprising a reactor jacket temperature controller, a reactor temperature controller, and a condenser-removed heat amount controller, wherein said temperature is controlled by setting the set value of the reactor jacket temperature controller at the output of the reactor temperature controller, and the set value of the condenser-removed heat amount controller is program-controlled.

4. A process as claimed in claim 1, said reaction system further comprising a cooling water controlling valve and a condenser-removed heat amount controller, wherein the cooling water controlling valve is adjusted with the output of the condenser-removed heat amount controller.

5. A process as claimed in claim 1, said reaction system further comprising a condenser cooling water temperature controller, a condenser cooling water flow rate controller, a condenser-removed heat amount controller, and a condenser cooling water controlling valve, wherein the heat amount removed by the condenser is controlled by setting the set value of the condenser cooling water temperature controller or condenser cooling water flow rate controller at the output of the condenser-removed heat amount controller, and the condenser cooling water controlling valve is adjusted with the output of the condenser cooling water temperature controller or condenser cooling water flow rate controller.

6. A process as claimed in claim 1, wherein the flow rate of the gas purged during purge per unit volume of the reaction vessel is 10 to 500 kg/m$^3$ hr.

7. A process as claimed in claim 1, wherein the unreacted monomer is purged for 0.5 second to 20 minutes every 30 seconds to 2 hours.

8. A process as claimed in claim 1, said reaction system further comprising a condenser-removed heat amount controller, wherein the setting and reading of the condenser-removed heat amount controller are compared with each other every 30 seconds to 30 minutes, and when the reading does not reach the setting, the unreacted monomer is purged for 0.5 second to 5 minutes.

* * * * *